Oct. 27, 1925.
R. F. KOENIG
1,558,678
PAPER HANGER'S TRIMMING GAUGE
Filed March 16, 1925
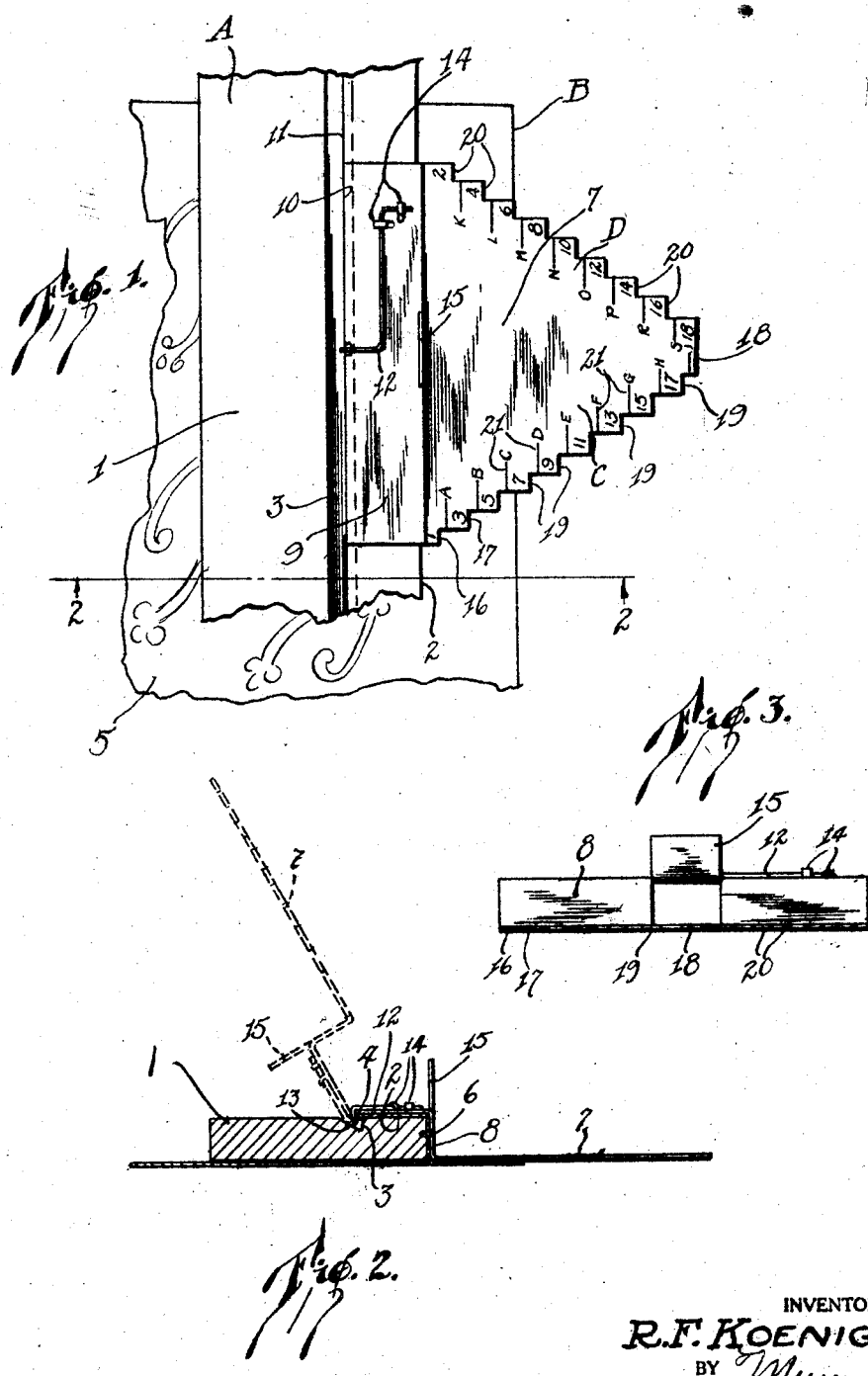
INVENTOR
R. F. KOENIG
BY
ATTORNEYS Patented Oct. 27, 1925.

1,558,678

UNITED STATES PATENT OFFICE.

RICHARD F. KOENIG, OF JACKSON, MICHIGAN.

PAPER-HANGER'S TRIMMING GAUGE.

Application filed March 16, 1925. Serial No. 15,967.

*To all whom it may concern:*

Be it known that I, RICHARD F. KOENIG, a citizen of the United States, and a resident of Jackson, in the county of Jackson and State of Michigan, have invented a new and useful Improvement in Paper-Hangers' Trimming Gauges, of which the following is a full, clear, and exact description.

My invention relates to improvements in paper hangers' trimming gauge, and it consists in the combinations, constructions and arrangements herein described and claimed.

An object of my invention is to provide a paper hanger's trimming gauge of the character described, by means of which the operator may lay a straight edge, to which the gauge is attached, at an exact pre-determined distance from the edge of the paper, thus permitting accurate trimming of the paper. My improved gauge embodies novel means for measuring the distance between the straight edge and the edge of the paper.

A further object of my invention is to provide a paper hanger's trimming gauge of the character described, by means of which the operator may tell at a glance precisely the distance from the straight edge to the edge of the paper and thus check on the position of the straight edge.

A further object of my invention is to provide a paper hanger's trimming gauge of the character described, in which novel means is provided for moving the measuring element of the gauge out of registration with the work engaging surface of the straight edge.

Other objects and advantages will appear in the following specification, and the novel features of the invention will be particularly pointed out in the appended claims.

My invention is illustrated in the accompanying drawings, forming part of this application, in which Figure 1 is a top plan view of an embodiment of my invention, Figure 2 is a view along the line 2—2 of Figure 1, and Figure 3 is a front elevation of the mechanism illustrated in Figure 1.

In carrying out my invention I make use of a straight edge 1 having a metal piece 2 at the work engaging edge for the purpose of maintaining a true and permanent straight work engaging edge for guiding cutting and trimming knives and the like therealong.

The straight edge 1 has a groove 3 extending longitudinally thereof substantially triangular in cross-section. The angle piece 2 extends toward the rear of the straight edge sufficiently to partially overlie the groove 3 as shown at 4.

Ordinarily the straight edge 1 is placed upon a piece of wall paper such as that shown at 5 and the distance between the upper end A of the straight edge and the edge B of the paper 5 is measured. The distance between the lower end, not shown, of the straight edge 1 and the edge B of the paper is also measured, thus the operator may feel reasonably sure that an even trim will be removed when a knife or the like is drawn along the work engaging surface 6 of the straight edge. This operation requires considerable time and is apt to be inaccurate unless the means for measuring the distance is carefully employed. The most objectional disadvantage is that of the time involved for using extraneous measuring means and which is an important element in paper hanging or the like.

My improved gauge for measuring the distance between the edge B of the paper and the work engaging surface 6 of the straight edge consists in a substantially triangular plate 7 having an upturned face 8, the height of the work engaging edge 6 and a portion 9 parallel with the plate 7 adapted to ride upon the upper part of the angle piece 2. The edge 10 of the portion 9 is in registration with the edge 11 of the angle piece 2.

A spring 12 having a portion thereof at 13 formed substantially in the shape of a hook is secured at 14 to the portion 9 of the plate and the hook portion 13 is adapted to yieldingly engage with the edge 10 of the angle piece 2, thus the plate 7 is held normally in the positions shown in Figures 1 and 2.

The spring 12 will give sufficiently to permit the plate 7 to be moved to the position shown in dotted lines as when the measuring device is not in use and during the process of trimming with a knife or the like along the work engaging surface 6.

Means for facilitating the elevation of the plate 7 is provided in an upturned gripping member 15 formed by shearing a portion of the vertical part 8 of the plate.

The plate 7 has its two exposed edges C and D respectively cut to form a series of steps. The first step on the edge C as shown at 16 is 1/8 of an inch from the work engaging surface 6 of the straight edge. The second step 17 is ¼ of an inch from the first step 16 and all succeeding steps are ¼ of an inch from the preceding step save for the outermost and common step 18 which in the case of the edge C is ⅛ of an inch from its preceding step 19.

The steps 20 on the side D are each ¼ of an inch from the preceding one and that step adjacent to the straight edge is exactly ¼ of an inch from the work engaging surface 6.

The steps on the side C are numbered 1, 3, 5, 7, 9, 11, 13, 15 and 17 respectively which means that the third step bearing the numeral 5 is ⅝ of an inch from the work engaging surface 6.

The steps on the side D are numbered 2, 4, 6, 8, 10, 12, 14, 16, and 18 respectively which means that the step bearing the numeral 6 is 6/8 of an inch from the work engaging surface 6.

In order to permit still finer measurement I place dividing lines 21 between each of the steps which are just 1/16 of an inch from the preceding step. These dividing lines are lettered A to S inclusively.

From the foregoing description of the various parts of the device, the operation thereof may be readily understood. Let us assume that it is desired to trim a strip 6/8 of an inch from the edge of the paper 5. The first step in the operation will be that of laying the straight edge 1 what is thought to be approximately 6/8 of an inch from the edge of the paper. The plate 7 is then moved to the position shown in full lines and the entire straight edge bearing the plate is moved so that the step marked 6 on the side D is in exact registration with the edge B of the paper. The end of the straight edge A bearing the gauge member 7 is therefore in its proper position for the trimming. It is now necessary to adjust the opposite end in exactly the same way to the end A. This may be done by sliding the entire gauge to the opposite end of the straight edge or by employing two sets of plates 7, one at each end of the straight edge. When the opposite end of the straight edge has been set by means of the step numbered 6, the plate 7 is moved to the position shown in dotted lines and a cutting knife or the like is moved along the work engaging surface 6 to trim off precisely 6/8 of an inch.

In like manner a trim of any desired width up to 2¼ inches may be measured with the particular plate shown in Figure 1. Obviously the plate 7 may be constructed to be used with greater or smaller trims.

While I have here shown and described a straight edge and also the particular construction for which my improved measuring device is used, it should be understood that the measuring device may be adapted to various types of straight edges, without departing from the spirit and scope of my invention.

I claim:

The combination with a straight edge having a work engaging surface, of a measuring means comprising a plate normally disposed in a plane parallel with and closely adjacent to the plane of the work engaging surface of the straight edge, said straight edge having a groove extending longitudinally thereof, and spring means secured to said plate for engaging with said groove, whereby the plate may slide longitudinally of said straight edge, and whereby the plate may be yieldingly disengaged with the straight edge at will, as by drawing the plate upwardly away from the work, said plate being provided with edges parallel with the edge of the work engaging surface.

RICHARD FREDRICK KOENIG.